(12) United States Patent
Niaz

(10) Patent No.: US 10,247,081 B2
(45) Date of Patent: Apr. 2, 2019

(54) AFTERTREATMENT ASSEMBLY TOLERANCE COMPENSATION SCHEME

(71) Applicant: Perkins Engines Company Limited, Peterborough (GB)

(72) Inventor: Naseer A. Niaz, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 15/818,196

(22) Filed: Nov. 20, 2017

(65) Prior Publication Data

US 2018/0142604 A1 May 24, 2018

(30) Foreign Application Priority Data

Nov. 21, 2016 (EP) .................................... 16199779

(51) Int. Cl.
| | |
|---|---|
| *F01N 13/18* | (2010.01) |
| *F01N 13/00* | (2010.01) |
| *B01D 53/94* | (2006.01) |
| *F01N 3/021* | (2006.01) |
| *F01N 3/20* | (2006.01) |
| *F01N 3/10* | (2006.01) |

(52) U.S. Cl.
CPC ....... *F01N 13/1805* (2013.01); *B01D 53/944* (2013.01); *B01D 53/9418* (2013.01); *F01N 3/021* (2013.01); *F01N 3/2066* (2013.01); *F01N 13/009* (2014.06); *F01N 13/1811* (2013.01); *F01N 3/103* (2013.01); *F01N 3/2006* (2013.01); *F01N 2340/04* (2013.01); *F01N 2470/24* (2013.01); *F01N 2590/08* (2013.01); *F01N 2610/02* (2013.01)

(58) Field of Classification Search
CPC .... F01N 3/021; F01N 3/2066; F01N 13/1811; F01N 13/1805; F01N 13/009
USPC .................................................. 422/169, 172
See application file for complete search history.

(56) References Cited

U.S. PATENT DOCUMENTS

| | | | |
|---|---|---|---|
| 5,775,100 A | 7/1998 | Sloss et al. | |
| 9,352,276 B2 | 5/2016 | Sampath | |
| 2010/0186394 A1 | 7/2010 | Harrison et al. | |
| 2012/0227376 A1* | 9/2012 | Deyoung | ................ F01N 13/18 60/272 |
| 2014/0137382 A1 | 5/2014 | Stonecipher | |
| 2014/0262590 A1 | 9/2014 | Daborn et al. | |
| 2015/0275476 A1 | 10/2015 | Sakai | |

(Continued)

FOREIGN PATENT DOCUMENTS

| | | |
|---|---|---|
| EP | 2889460 A1 | 7/2015 |
| JP | 5-414871 B1 | 2/2014 |
| WO | 2014/167355 A1 | 10/2014 |

*Primary Examiner* — Tom P Duong
(74) *Attorney, Agent, or Firm* — Hibshman Claim Construction PLLC

(57) ABSTRACT

An aftertreatment assembly for an internal combustion engine is disclosed. The assembly includes an aftertreatment component with an inlet, and a pipe connection fluidly connected to the inlet. The pipe connection includes an adjustable spherical pipe joint that joins two angularly offset pipe sections, and a slip pipe joint that joins two axially aligned pipe sections and that can adjust a combined length of the two axially aligned pipe sections. The assembly allows for compensating the positional and orientational displacements between an exhaust outlet and the inlet of the aftertreatment assembly.

14 Claims, 6 Drawing Sheets

(56) References Cited

U.S. PATENT DOCUMENTS

2016/0053661 A1 2/2016 Freeman et al.
2016/0115847 A1 4/2016 Chapman et al.
2016/0333765 A1 11/2016 Turk et al.

* cited by examiner

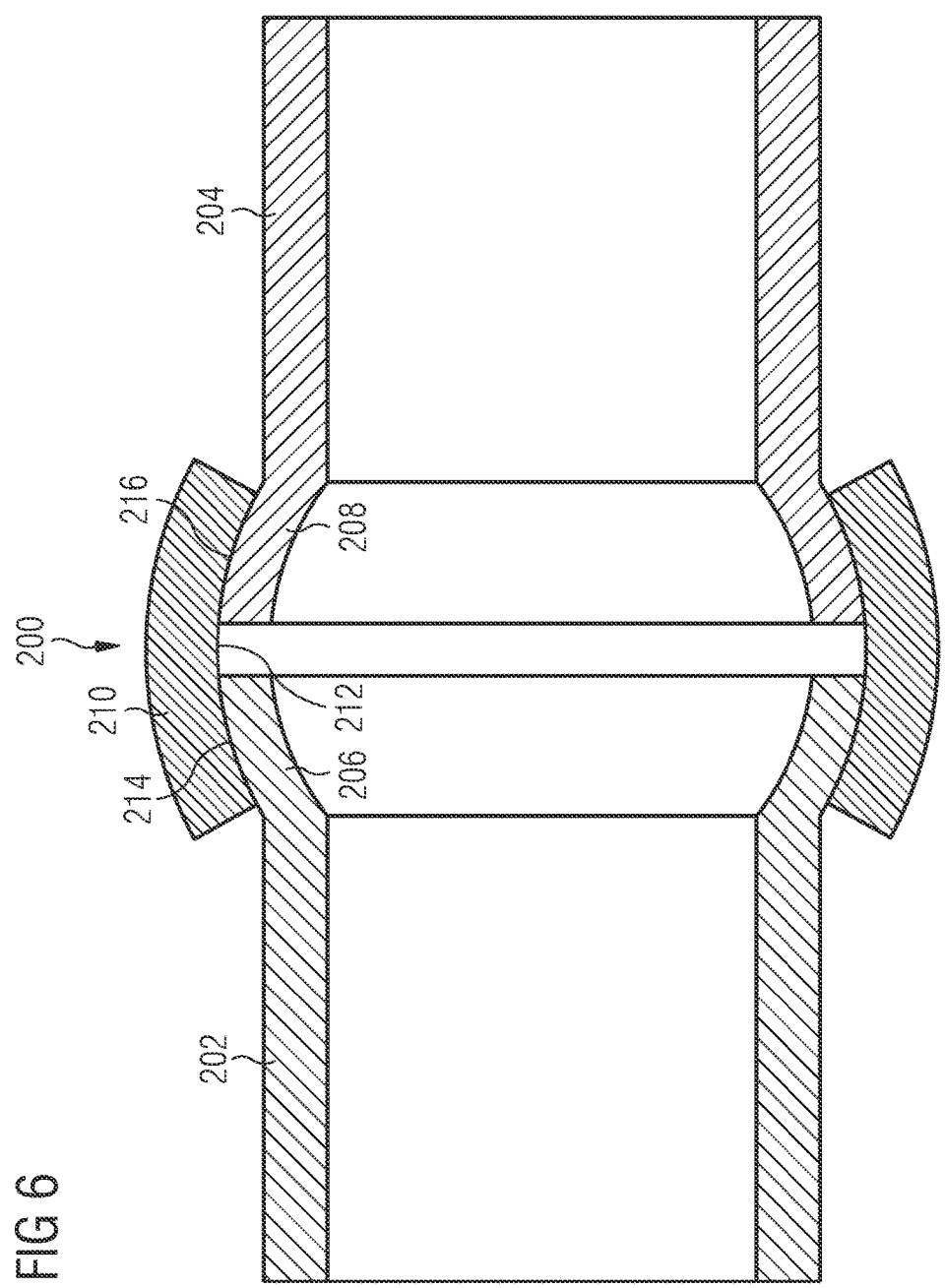

AFTERTREATMENT ASSEMBLY TOLERANCE COMPENSATION SCHEME

CLAIM FOR PRIORITY

This application claims benefit of priority of European Patent Application No. 16199779.6, filed Nov. 21, 2016, which is incorporated herein by reference.

TECHNICAL FIELD

The present disclosure relates to an internal combustion engine. More particularly, the present disclosure relates to an aftertreatment assembly for an internal combustion engine, and a related method for mounting the aftertreatment assembly to an exhaust outlet of an internal combustion engine.

BACKGROUND

Engines, such as internal combustion engines, exhaust a complex mixture of air pollutants and condensate. In order to comply with environmental and legal requirements and sometimes in order to improve performance of the engine, an exhaust gas aftertreatment assembly or system may be provided. The aftertreatment assembly is connected to exhaust ports of the engine, for example, an exhaust outlet of a turbine of a turbocharger, for treating the exhaust gases.

Most commonly exhaust gases comprise hydrocarbons (HC), carbon monoxides (CO), mono-nitrogen oxides ($NO_x$) and particulate matter, such as carbon (C), a constituent of soot. Some of those substances may be reduced by careful control of the operating conditions of the engine. However, usually it is necessary to provide an emissions cleaning module downstream of the engine to treat at least some of those substances entrained in the exhaust gas. Various apparatus for reducing and/or eliminating constituents in emissions are known. For example, an oxidation device, such as a diesel oxidation catalyst (DOC) module, may be provided to reduce or to eliminate hydrocarbons (HC) and/or carbon monoxide (CO). In addition, mono-nitrogen oxides ($NO_x$) in diesel combustion emissions may be reduced or eliminated by a selective catalytic reduction (SCR) module. Moreover, particulate matter may be filtered from the exhaust gas by a particle filter (PF) included in the aftertreatment assembly.

Due to increased attention for the environment, exhaust emission standards have become and still are becoming more stringent. Moreover, due to increase of fuel costs, engine performance and economics have become more important. In order to comply with these requirements engine manufacturers have developed exhaust aftertreatment systems which are tailored to specific engines. Those tailored aftertreatment systems may be configured depending on, for example, engine type, size, class and intended use of the engines, fuel types and engine loads. Aftertreatment systems may be large and normally have to be assembled from many different components, placed in different positions of a vehicle or work tool, separated by connecting pipes and hoses. Thus, it may be challenging to design and mount a large aftertreatment system to an engine under consideration of packing requirements.

For example, US 2010/0186394 A1 of Caterpillar Inc. discloses a combustion engine exhaust aftertreatment system mount. The mount includes a body, with a first mounting position, a second mounting position, and a foot for mounting the body to an engine or wall. The first mounting position has a first mounting surface, and the second mounting position has a second mounting surface. The first mounting position has a first longitudinal axis, and the second mounting position has a second longitudinal axis. The first axis is positioned substantially parallel to the second axis. A combustion engine exhaust aftertreatment system includes the mount and at least two exhaust gas aftertreatment components chosen from the group including a particle filter (PF), a muffler, a heat source for PF regeneration, a Selective Catalytic Reductor (SCR) and a mixing chamber. At least one of the components is positioned in the first mounting position and the at least one other component is positioned in the second mounting position, fluidly connected to the first component.

The present disclosure is directed, at least in part, to improving or overcoming one or more aspects of prior systems.

SUMMARY OF THE DISCLOSURE

In one aspect, the present disclosure relates to an aftertreatment assembly for an internal combustion engine. The aftertreatment assembly comprises a first aftertreatment component including a first inlet, and a first pipe connection fluidly connected to the first inlet. The first pipe connection includes a first adjustable spherical pipe joint configured to join two angularly offset pipe sections, and a first slip pipe joint configured to join two axially aligned pipe section to adjust a combined length of the two axially aligned pipe sections.

In another aspect, the present disclosure relates to method for mounting the aftertreatment assembly according to the above aspect to an exhaust outlet of an internal combustion engine. The method comprises fastening a mounting structure to an engine block of the internal combustion engine, the mounting structure including a first mounting portion for the first aftertreatment component. The method further comprises arranging the first aftertreatment component at the first mounting portion, and connecting the first pipe connection between the exhaust outlet and the first inlet. The method further comprises adjusting and tightening the first slip pipe joint and the first spherical pipe joint from upstream to downstream, and thereby, adjusting a position of the first aftertreatment component relative to the first mounting portion. The method further comprises, after adjusting the position of the first aftertreatment component, fastening the first aftertreatment component to the first mounting portion.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 6 is a schematic cut view through a spherical (ball) pipe joint.

DETAILED DESCRIPTION

Figure 1:
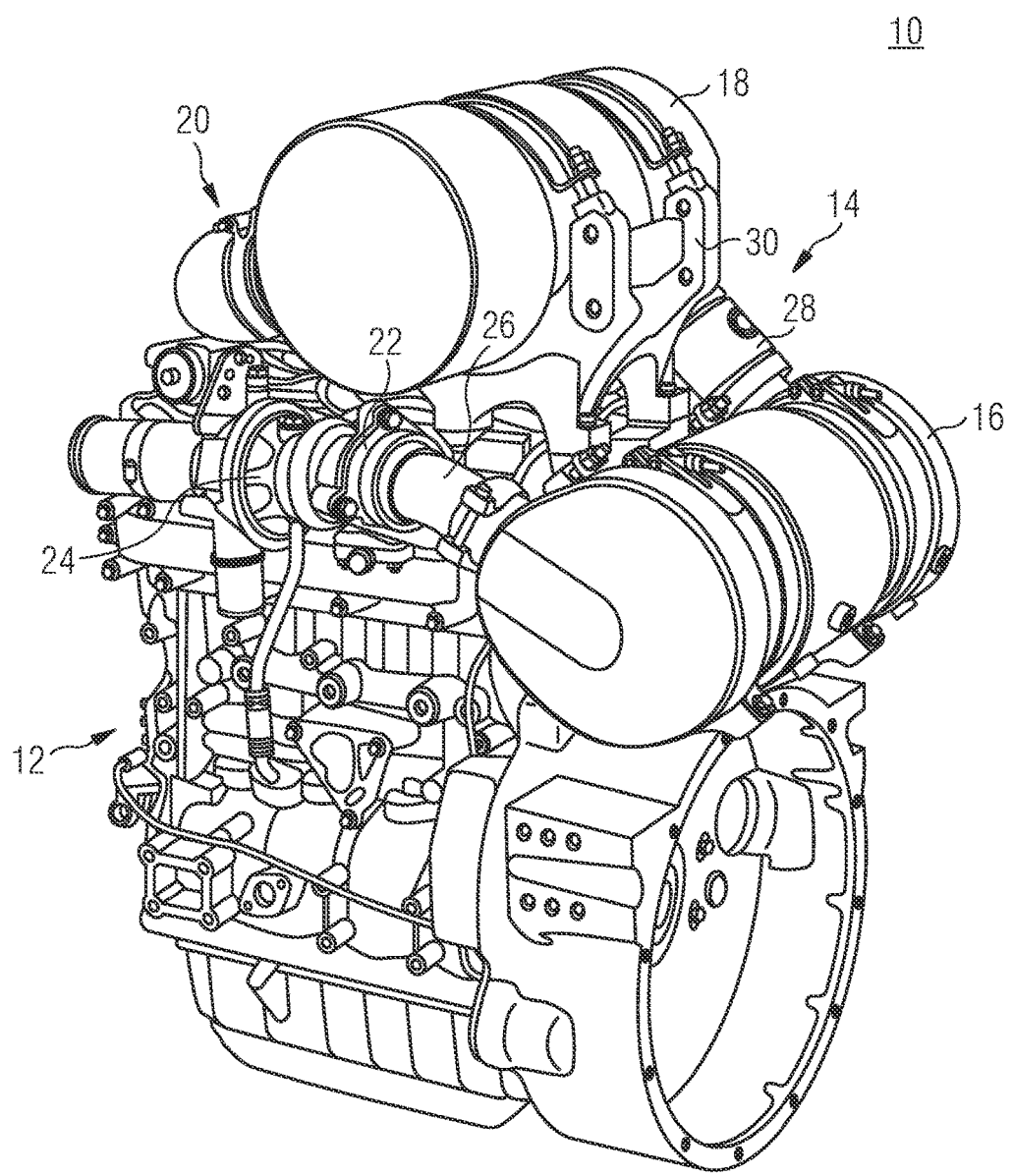
FIG. 1 is a perspective view of an internal combustion engine equipped with an exemplary aftertreatment assembly according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that providing an elastic bellows to compensate a positional and/or orientational displacement between the exhaust outlet of an internal combustion engine and an inlet of an exhaust gas aftertreatment assembly due to mounting and manufacturing tolerances may be less than optimal. The reason is that the elastic bellows may be costly, and may typically require a certain amount of space, which might be hard to provide in compact engine designs. Further, more than one elastic bellows may be required for exhaust gas aftertreatment assemblies including more than one aftertreatment component such as DOC, SCR.

Accordingly, herein it is suggested to provide a series of variable pipe joints in a specific arrangement allowing to compensate for positional and orientational displacements between the exhaust outlet and the inlet of the exhaust gas aftertreatment assembly. Furthermore, the aftertreatment assembly as disclosed herein allows to adjust a position of the aftertreatment components relative to their mounting structure to further improve the ability to assemble the aftertreatment system in its intended arrangement and position. The variable pipe joints and their arrangement as disclosed herein is cost-efficient and space-saving.

Referring to FIG. 1, an internal combustion engine 10 including an engine block 12 and an aftertreatment assembly 14 is shown. Particularly, the aftertreatment assembly 14 is mounted on top of the engine block 12. In other embodiments, for example, the aftertreatment assembly 14 may be mounted at any other suitable position of the engine block 12.

For the purpose of describing exemplary embodiments of the present disclosure, the internal combustion engine 10 is considered as a four-stroke internal combustion engine. One skilled in the art will appreciate, however, that the internal combustion engine 10 may be any type of engine (turbine, gas, diesel, natural gas, propane, two-stroke, etc.) that could be equipped with an aftertreatment assembly for cleaning the exhaust gases as disclosed herein. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications.

The exhaust gas aftertreatment assembly 14 may be provided between engine exhaust port(s) of the engine block 12 and an end of the exhaust pipe such as the tail pipe. The aftertreatment assembly 14 may be used for environmental reasons, for engine performance reasons and/or for fuel economical reasons and may be provided with different components, depending on for example engine size, fuel type, environmental requirements, fuel economical requirements, engine performance requirements and other engine or control requirements or requirements of, for example, a work tool, vehicle or appliance in or for which the engine is to be used. For example, these components may be chosen from the group including a muffler, a particle filter, a heat source for particle filter regeneration, catalysts (for example, diesel oxidation catalyst (DOC), selective catalytic reducter (SCR)), and a mixing chamber and SCR fluid injector, and other exhaust gas treatment devices.

In the shown embodiment, the exhaust gas aftertreatment assembly 14 includes a first aftertreatment component 16, a second aftertreatment component 18, and a third aftertreatment component 20 (hidden behind the second aftertreatment component 18 in the schematic perspective view of FIG. 1). The first aftertreatment component 16 includes a DOC and a PF, the second aftertreatment component 18 includes an SCR, and the third aftertreatment component 20 includes a mixing pipe and a fluid injector for injecting an SCR fluid into the mixing pipe upstream of the SCR. However, again, it is noted that in other embodiments more or less aftertreatment components with similar and/or different exhaust gas treatment devices may be provided.

As will be described in greater detail later on, the first aftertreatment component 16 is fluidly connected to and downstream of an exhaust outlet 22 of a turbine 24 of a turbocharger of the engine 10 via a first pipe connection 26. A second pipe connection 28 fluidly interconnects the first aftertreatment component 16 and the third aftertreatment component 20, which in turn is fluidly connected to and downstream of the second aftertreatment component 18.

It is noted that the third aftertreatment component 20 is provided upstream of the second aftertreatment component 18 although the names ("second" and "third) may indicate otherwise. However, the names are given with respect to the claim language, and with respect to the exemplary embodiment, in which the mounting assembly for mounting the aftertreatment components includes two mounting portions only, namely a first mounting portion for the first aftertreatment component 16, and a second mounting portion for the second aftertreatment component 18.

The aftertreatment assembly 14 further includes a mounting structure 30 mounting the aftertreatment components 16, 18 and 20 to the engine block 12. The mounting structure 30 is shown in greater detail in FIG. 2 without the aftertreatment components and connection pipes.

Figure 2:
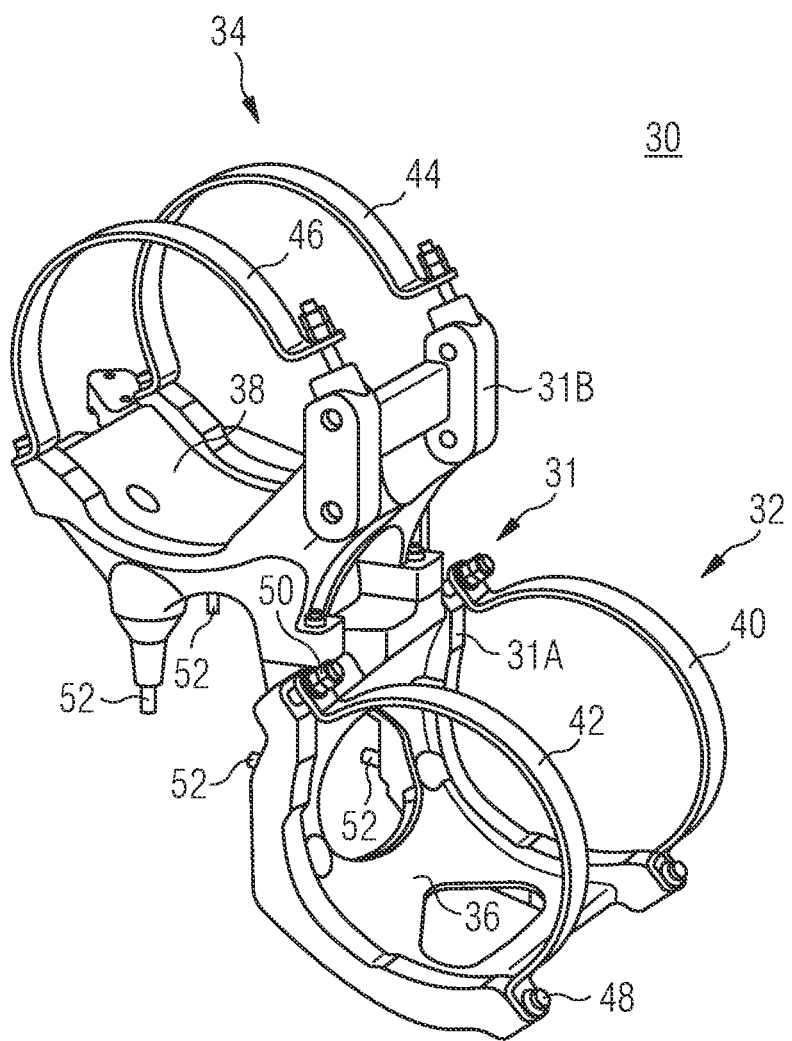
FIG. 2 is a perspective view of a mounting structure of the exemplary aftertreatment assembly according to the present disclosure.

As can be seen in FIG. 2, the mounting structure 30 includes a body 31 with a first mounting portion 32 and a second mounting portion 34. The body 31 may be formed in one piece, or, as shown in the embodiment of FIG. 2, as a multipiece part, for example, including a first part 31A for the first mounting portion 32 and a second part 31B for the second mounting portion 34. The first and second parts 31A,31B may be releasably connected to one another (for example, by one or more screw connections). The first mounting portion 32 is configured for receiving the first aftertreatment component 16 (see FIG. 1), and the second mounting portion is configured for receiving the second aftertreatment component 18 (see FIG. 1).

The first mounting portion 32 and the second mounting portion 34 include curved mounting faces 36 and 38 for providing a contact or support area for the aftertreatment components 16 and 18, respectively, in a mounted state. Moreover, the first and second mounting portions 32 and 34 each include two connectors 40-46. The connectors 40-46 are formed as ring segments (bands or straps), for example half ring segments. The connectors 40-46 are releasable from the mounting structure 30 for allowing arranging the respective aftertreatment component at the mounting portion, particularly in contact with the mounting faces 36 and 38.

Specifically, for example, the first connector 40 is fastenable to the body 31 via at least one fixing element, for example, a first screw connection 48 and a second screw connection 50. The first screw connection 48 and the second screw connection 50 are provided at opposite ends of the first connector 40, and at different positions of the first mounting portion 32. In a mounted state of the connectors 40-46 mounted to the body 31, the connectors 40-46 can be in a tightened state, in which the associated screw connections are tightened. In the tightened state of the connectors 40-46, the first and second aftertreatment components 16, 18 are non-rotatably and axially fixed in the mounting portions 32 and 34, respectively. In an untightened state of the connectors 40-46, in which the associated screw connections may be connected but not (yet) tightened, the aftertreatment components 16 and 18 are movable in the associated mounting portions 32 and 34. Specifically, the aftertreatment components 16 and 18 are rotatable about a component longitudinal axis and may be axially displaceable along the component longitudinal axis depending on the configuration of the respective aftertreatment component as described in greater detail later on.

The first connectors 40, 42, and the first mounting face 36 form two closable ring structures for securely holding the first aftertreatment component 16 in place. Similarly, the second connectors 44, 46 and the second mounting face 38 form two closable ring structures for securely holding the second aftertreatment component 18 in place.

In other embodiments, the mounting structure 30 may be configured in any other fashion allowing to mount at least one of the first and second aftertreatment components 16 and 18. For example, more or less connectors per aftertreatment component, and/or more or less mounting portions may be provided. Particularly, the mounting structure 30 may include a third mounting portion for the third aftertreatment component 20. Moreover, the connectors 40-46 may be configured in any other fashion allowing to rotate and/or displace the respective aftertreatment component 16 and 18 in an untightened state of the connectors 40-46.

The mounting structure 30 is mountable to the engine block 12 via a plurality of (for example, four) mounting screws 52 insertable into respective throughholes of the body 31.

Under specific reference to FIGS. 3 and 4, the exemplary aftertreatment assembly 14 is described in more detail in the following.

Figure 3:
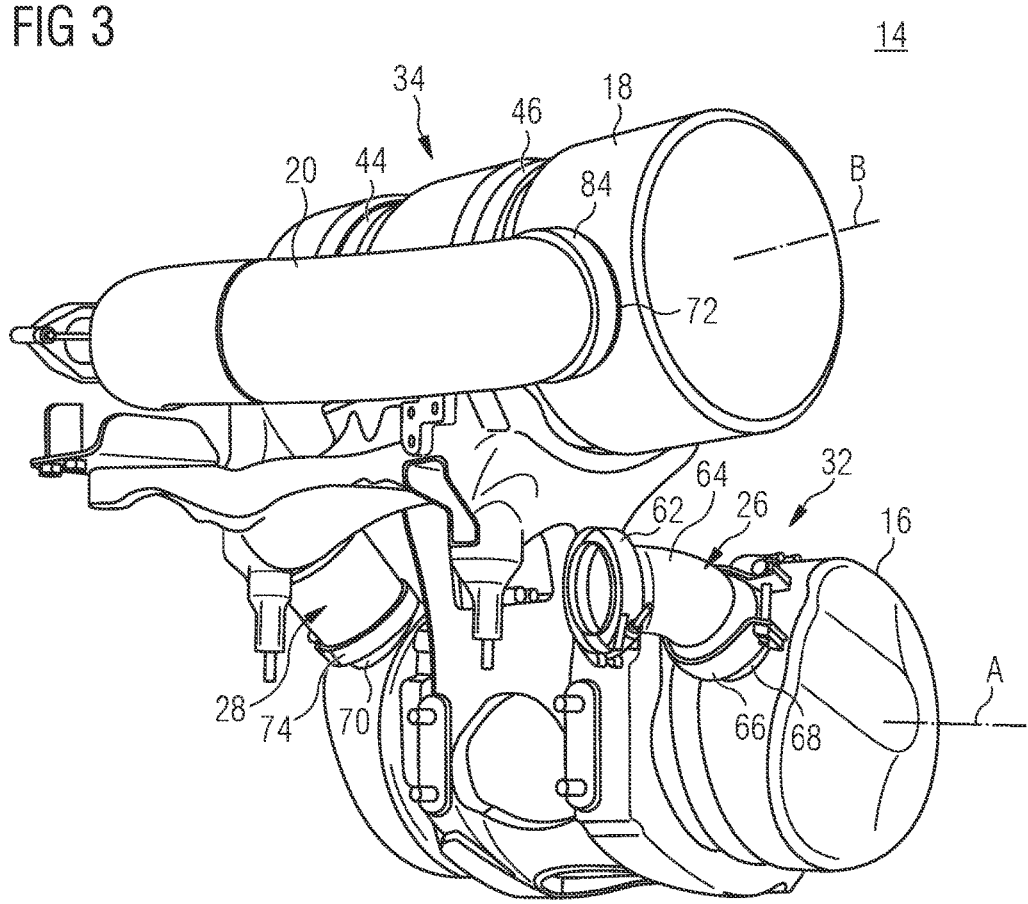
FIG. 3 is a perspective view of the exemplary aftertreatment assembly according to the present disclosure.
Figure 4:
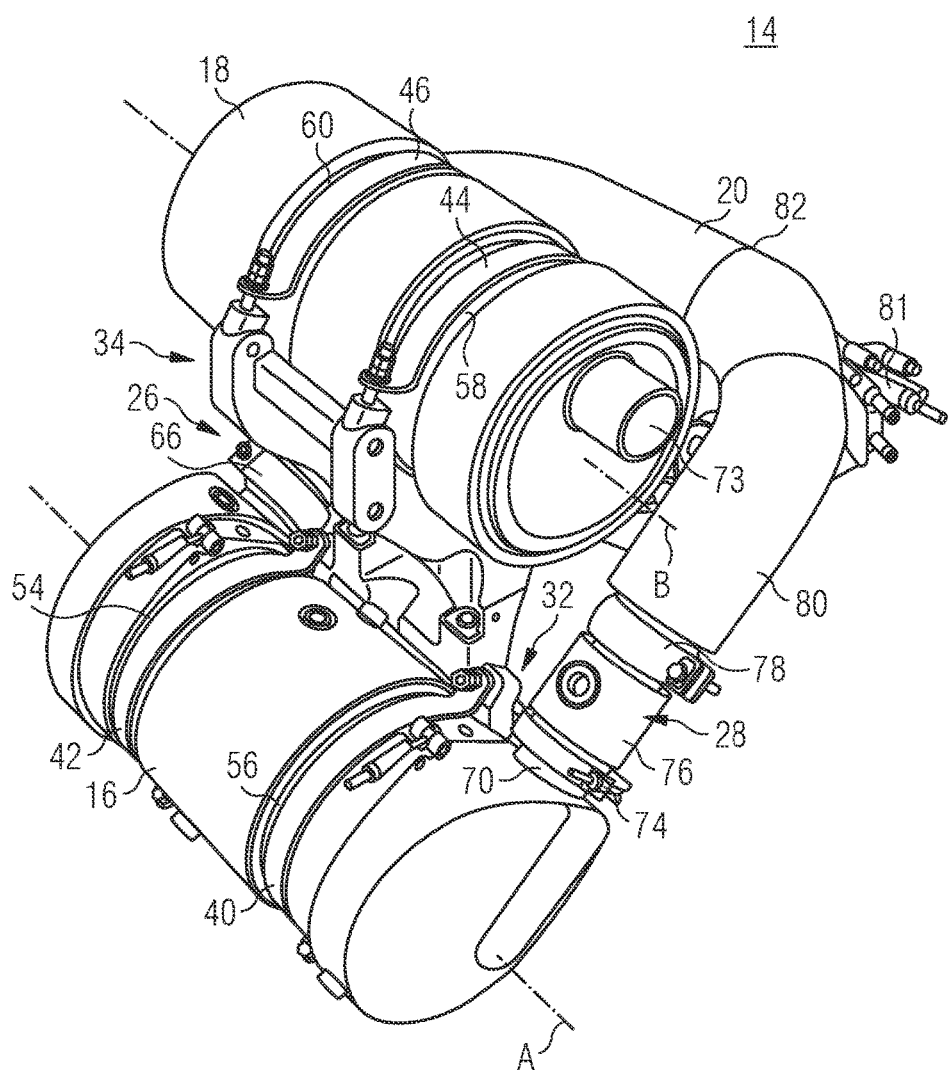
FIG. 4 is another perspective view of the exemplary aftertreatment assembly according to the present disclosure.

As can be seen in FIGS. 3 and 4, the depicted aftertreatment assembly 14 includes from upstream to downstream the first pipe connection 26 for connection to the exhaust outlet 22 (see FIG. 1), the first aftertreatment component 16, the second pipe connection 28, the third aftertreatment component 20, and the second aftertreatment component 18.

The first aftertreatment component 16 extends along a first longitudinal axis A, and is mounted to the first mounting portion 32 via the first connectors 40, 42. The second aftertreatment component 18 extends along a second longitudinal axis B, and is mounted to the second mounting portion 34 via the second connectors 44, 46. In the shown embodiment, the first and second longitudinal axes A and B extend substantially in parallel.

The first and second aftertreatment components 16, 18 include a substantially cylindrical (can-like) outer shape or housing having grooves or portions with reduced diameter 54-60. Said grooves 54-60 at least partially extend along an outer circumference of the first and second aftertreatment components 16 and 18 about the first and second axes A and B, respectively. For example, the first aftertreatment component 16 includes two first grooves 54 and 56 at opposite ends along the first longitudinal axis A. The grooves 54-60 are configured to allow a displacement of the first and second aftertreatment components 16 and 18 along the longitudinal axes A and B in a state, in which the aftertreatment components 16 and 18 are received by the mounting portions 32 and 34 but the connectors 40-46 are not (yet) tightened. In other words, a position of the first and second aftertreatment components 16 and 18 with respect to the longitudinal axes A and B, respectively, is adjustable. Specifically, the grooves 54-60 include a groove width in a direction parallel to the longitudinal axes A and B, respectively. The groove width is greater than a width of the strap or band-shaped connectors 40-46 in a direction parallel to the longitudinal axes A and B, respectively.

The first pipe connection 26 fluidly connects the exhaust outlet 22 of the internal combustion engine 10 and a first inlet 68 of the first aftertreatment component 16. The first pipe connection 26 includes a first slip pipe joint 62, a bent first pipe section 64, and a first spherical pipe joint 66. The first slip pipe joint 62 and the first spherical pipe joint 66 are arranged at opposing ends of the first pipe section 64. The first slip pipe joint 62 fluidly interconnects the exhaust outlet 22 of the turbine 24 (see FIG. 1) and the first pipe section 64. The first spherical pipe joint 66 fluidly interconnects the first pipe section 64 and a first inlet 68 of the first aftertreatment component 16. In other embodiments, the first slip pipe joint 62 and/or the first spherical pipe joint 66 may be arranged at other positions of the first pipe connection 26.

By including the first slip pipe joint 62 and the first spherical pipe joint 66, the first pipe connection 26 is configured to provide an adjustable connection between the exhaust outlet 22 and the first inlet 68. Specifically, the first pipe connection 26 is length adjustable by providing the first slip pipe joint 62, and angularly adjustable by providing the first spherical pipe joint 66. Thus, an offset between the exhaust outlet 22 and the first inlet 68 can be compensated and, moreover, the first pipe connection 26 can be set in different ways to account for different positions of the exhaust outlet 22 and/or the first inlet 68. Exemplary configurations of the first slip pipe joint 62 and the first spherical pipe joint 66 are described later on with reference to FIGS. 5 and 6.

The second pipe connection 28 fluidly connects a first outlet 70 of the first aftertreatment component 16 via the third aftertreatment component 20 to a second inlet 72 of the second aftertreatment component 18 further including a second outlet 73 connectable to an end of the exhaust pipe such as the tail pipe. The second pipe connection 28 includes a second slip pipe joint 74, a straight second pipe section 76, a second spherical pipe joint 78, and a bent second pipe section 80. The second slip pipe joint 74 is arranged at the first outlet 70 to fluidly interconnect the first outlet 70 and the straight second pipe section 76. The second spherical pipe joint 78 fluidly interconnects the straight second pipe section 76 and the bent second pipe section 80. The second pipe section 80 further includes an injector device 81 for injecting a selective catalytic reduction agent, for example a urea solution, so that the agent can mix with the exhaust gas in the third aftertreatment component (the mixing pipe) 20.

Similar to the first pipe connection 26, the second pipe connection 28 is configured to provide a length and angularly adjustable connection between components of the aftertreatment assembly 14. Specifically, the second pipe connection 28 is length adjustable due to the presence of the second slip pipe joint 74, and angularly adjustable due to the presence of the second spherical pipe joint 78. Thus, an offset between the first outlet 70 and the third inlet 82 of the third aftertreatment component 20 (the second inlet 72 of the second aftertreatment component 34) can be compensated and set in different ways to account for different positions of the first outlet 70 and/or the second inlet 72 and/or the third inlet 82, etc.

Additionally, in the shown embodiment, a third slip pipe joint 84 fluidly interconnects the third aftertreatment component 20 and the second inlet 72 of the second aftertreatment component 18 in a length-adjustable manner.

The length-adjustable and angle-adjustable first and second pipe connections 26 and 28 allow to account for mounting and manufacturing tolerances with respect to a position of the exhaust outlet 22 (see FIG. 1), and positions of the elements of the aftertreatment assembly 14, particularly the inlets and outlets thereof, without providing costly and space-filling elastic bellows etc. Specifically, the first slip pipe joint 62 allows adjusting an effective length of the first pipe connection 26. The first spherical pipe joint 66 allows an angular displacement of the first pipe connection 26 with respect to the first aftertreatment component 16. The second slip pipe joint 74 allows adjusting an effective length of the second pipe connection 28. The second spherical pipe joint allows to angularly displace the second pipe connection 28 with respect to at least one of the first aftertreatment component 16 and the second aftertreatment component 18. The third slip pipe joint 84 allows to adjust an effective length of the mixing chamber (the third aftertreatment component) 20.

The flexibility of the tolerance compensation may be further improved by configuring the aftertreatment assembly 14 to allow a rotational and longitudinal displacement of the aftertreatment components 16-20 in an untightened state of the connectors 40-46. However, it is noted, that in some embodiments it might be sufficient to provide the variable first and/or second pipe connections 26 and 28 without providing the possibility to rotate and/or displace the aftertreatment components 16-20.

Figure 5:
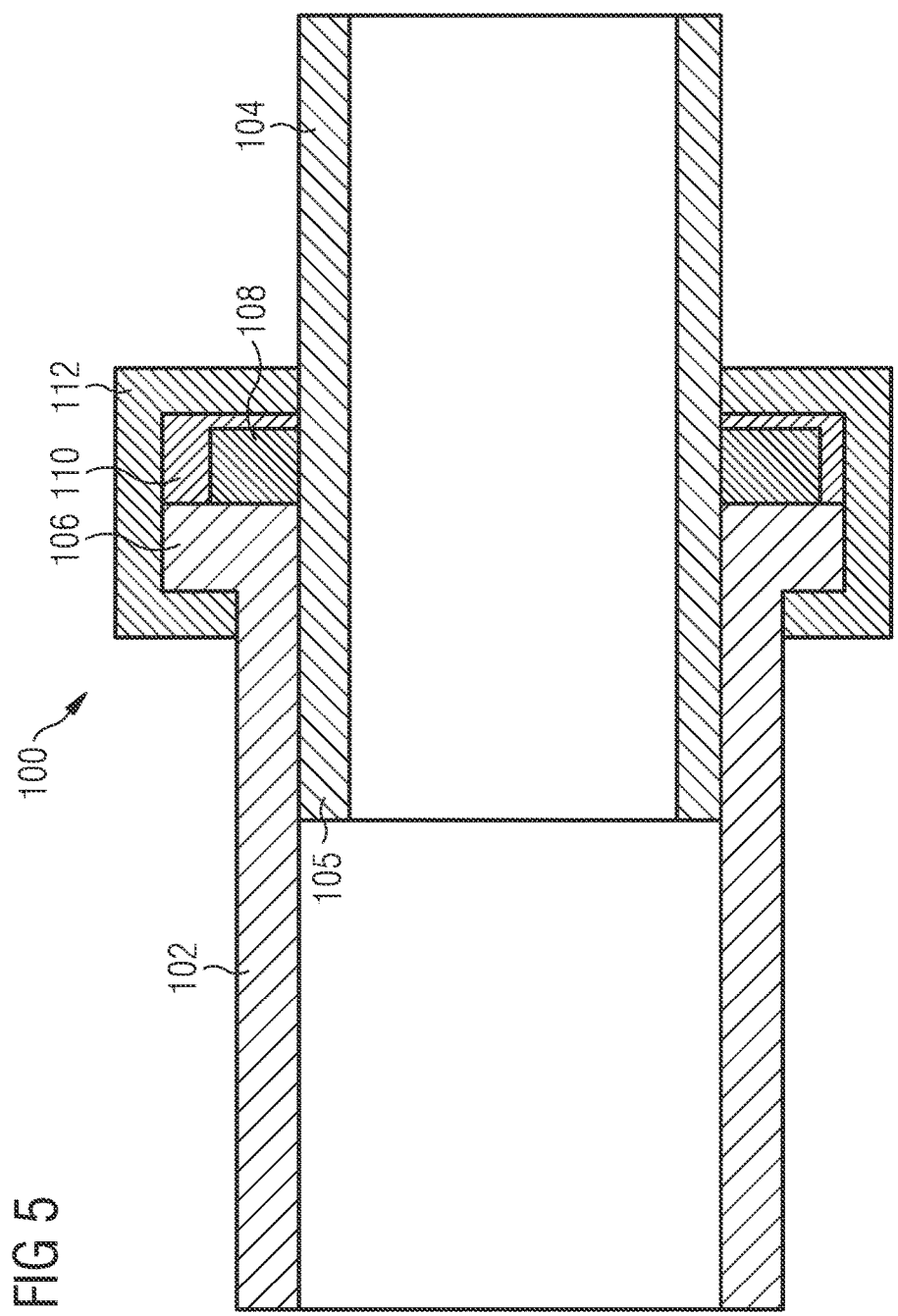
FIG. 5 is a schematic cut view through a slip pipe joint.

Referring to FIG. 5, an exemplary slip pipe joint 100 is depicted in a cut view. The slip pipe joint 100 may be used as the first slip pipe joint 62, the second slip pipe joint 74, and the third slip pipe joint 84. As described by way of example in the following, the slip pipe joint 100 is configured to join two axially aligned pipe sections inserted into each other for adjusting a combined length of the two axially aligned pipe sections.

Particularly, the slip pipe joint 100 connects a first pipe section 102 and a second pipe section 104. An outer diameter of the second pipe section 104 substantially corresponds to an inner diameter of the first pipe section 102 so that the second pipe section 104 is insertable into the first pipe section 102. The first pipe section 102 further includes a flange portion 106 at an end thereof, for example formed as a flared end of the first pipe section 102. The flange portion 106 extends in a circumferential direction and radially outward. The second pipe section 104 includes a plane end 105 inserted into the first pipe section 102.

The slip pipe joint 100 includes a sealing ring 108, a slidable flange 110, and a clamp body 112. The sealing ring 108 abuts the flange portion 106 at an end face thereof. The slidable flange 110 surrounds the sealing ring 108 to protect the same. The clamp body 112 is attachable about the flange portion 106 and the slidable flange 110 in a released and untightened state. In a tightened (clamped) state, the clamp body 112 is configured to provide a first clamping force that pushes the flange portion 106 and the slidable flange 110 together in a longitudinal direction of the pipe sections 102 and 104. Additionally, the clamp body 112 exerts a second clamping force that pushes the first pipe section 102, particularly the flange portion 106, against the second pipe section 104 in a radial direction of the pipe sections 102 and 104. As a result, the slip pipe joint 100 sealingly engages the first pipe section 102 and the second pipe section 104. Additionally the slip pipe joint 100 allows a relative longitudinal displacement between the pipe sections 102 and 104 in an untightened state so that an effective length of the first pipe section 102 and/or the second pipe section 104, and thus a combined length, can be adjusted.

It is noted that the configuration shown in FIG. 5 is schematically and exemplary only for a slip pipe joint. For example, in some embodiments, the sealing ring 108 may be a trapezoidal seal, and the clamp body 112 may be a V-type clamp body.

Referring to FIG. 6, an exemplary adjustable spherical pipe joint 200 is depicted in a cut view. The spherical pipe joint 200 may be used as the first and second spherical pipe joints 66 and 78. As is described by way of example in the following, the adjustable spherical pipe joint is configured to join two angularly offset pipe sections.

Particularly, the spherical pipe joint 200 connects the first pipe section 202 and the second pipe section 204. The first and second pipe sections 202, 204 include so-called ball-shaped flanges 206 and 208, respectively. The flanges 206 and 208 extend in both a longitudinal direction and a radial direction of the pipe sections 202, 204. The flanges 206 and 208 extend with an arcuate profile. A clamp body 210 is fitted over the flanges 206, 208. The clamp body 210 includes an arcuate (concave) circumferential inner face 212. The inner face 212 contacts arcuate (convex) circumferential outer faces 214 and 216 of the flanges 206 and 208, respectively. The spherical pipe joint 200 allows to annularly displace the first pipe section 202 with respect to the second pipe section 204, and vice versa, in an untightened state of the clamp body 210. In other words, the spherical pipe joint 200 allows to join two angularly offset pipe sections. As a result, the spherical pipe joint 200 provides an angle compensation between the first pipe section 202 and the second pipe section 204 in case the pipe sections 202 and 204 are not axially aligned with each other.

Again, it is noted that a configuration shown in FIG. 6 is schematically and exemplary only. For example, the spherical pipe joint 200 may further include one or more sealing rings for improving the sealing between the clamp body 210 and the flanges 206 and 208.

INDUSTRIAL APPLICABILITY

The aftertreatment assembly 14 as disclosed herein can be used for providing a variable assembly capable of coping with different positions and orientations of the exhaust outlet 22 of the internal combustion engine 10. Particularly, the aftertreatment assembly 14 is suitable for compact and cost-efficient designs.

The present disclosure further relates to a method for mounting the aftertreatment assembly 14 to the engine block 12. The method includes a successive adjustment and fixing of the variable elements of the aftertreatment assembly from upstream (the exhaust outlet 22) to downstream. In the following, the mounting method is described with reference to FIGS. 1 to 4.

Particularly, the method includes fastening the mounting structure 30 to the engine block 12, and arranging the first aftertreatment component 16 at the first mounting portion 32. The method further includes connecting the first pipe connection 26 between the exhaust outlet 22 and the first inlet 68. Then, the first slip pipe joint 62 and the first spherical pipe joint 66 are adjusted and tightened from upstream to downstream. Thereby, a position of the first aftertreatment component 16 relative to the mounting structure is adjusted, because the connectors 40 and 42 are not yet tightened. After adjusting the position of the first aftertreatment component 16 and tightening (clamping) the first slip pipe joint 62 and the first spherical pipe joint 66, the first aftertreatment component 16 is fastened to the mounting structure 30, particularly the first mounting portion 32, by tightening the connectors 40 and 42.

Then, additionally, the method may further include arranging the second aftertreatment component 18 at the second mounting portion 34, and connecting the second inlet 72 of the second aftertreatment component 18 to the first outlet 70 of the first aftertreatment component 16 via a second pipe connection 28 and, in some embodiments, the third aftertreatment component 20. Then, the second slip pipe joint 74 and the second spherical pipe joint 78 are adjusted and tightened (clamped) from upstream to downstream. Thereby, a position of the second aftertreatment component 18 (and the third aftertreatment component 20) relative to the mounting structure 30 is adjusted. After tightening (clamping) the second slip pipe joint 74 and the second spherical pipe joint 78, and adjusting the position of the second aftertreatment component 18, the second aftertreatment component 18 is fastened to the mounting structure 30, particularly the second mounting portion 34, by tightening the connectors 44 and 46.

The method may then further include adjusting and tightening the third slip pipe joint 84.

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

What is claimed is:

1. An aftertreatment assembly for an internal combustion engine, the aftertreatment assembly comprising:
   a first aftertreatment component including a first inlet;
   a mounting structure including a first mounting portion for mounting the first aftertreatment component; and
   a first pipe connection fluidly connected to the first inlet the first pipe connection including:
      a first adjustable spherical pipe joint configured to join two angularly offset pipe sections, and
      a first slip pipe joint configured to join two axially aligned pipe sections to adjust a combined length of the two axially aligned pipe sections,
   wherein the first aftertreatment component includes a first longitudinal axis, and the first aftertreatment component is rotatable in the first mounting portion about the first longitudinal axis and/or the first aftertreatment component is displaceable along the first longitudinal axis in the first mounting portion.

2. The aftertreatment assembly of claim 1, wherein the mounting structure includes at least one connector, particularly a band or strip, configured to:
   non-rotatably and axially fix the first aftertreatment component in the first mounting portion in a tightened state of the connector, and
   allow rotational and/or axial displacement of the first aftertreatment component in an untightened state of the connector.

3. The aftertreatment assembly of claim 1, wherein the first slip pipe joint and the first adjustable spherical pipe joint are positioned at opposite ends of the first pipe connection.

4. The aftertreatment assembly of claim 1, further comprising a second pipe connection fluidly connected to a first outlet of the first aftertreatment component, the second pipe connection including at least one of:
   a second spherical pipe joint configured to join two angularly offset pipe sections, and
   a second slip pipe joint configured to join two axially aligned pipe sections to adjust a combined length of the two axially aligned pipe sections.

5. The aftertreatment assembly of claim 4, wherein the second slip pipe joint and the second spherical pipe joint are positioned at opposite ends of the second pipe connection.

6. The aftertreatment assembly of claim 4, wherein at least one of the first pipe connection and the second pipe connection does not include a bellows.

7. The aftertreatment assembly of claim 1, further comprising a second aftertreatment component including a second inlet fluidly connected to the first aftertreatment component,
   wherein a first longitudinal axis of the first aftertreatment component is substantially parallel to a second longitudinal axis of the second aftertreatment component.

8. The aftertreatment assembly of claim 7, wherein the mounting structure further includes a second mounting portion for mounting the second aftertreatment component, the second aftertreatment component including a second longitudinal axis, and the second aftertreatment component being rotatable in the second mounting portion about the second longitudinal axis and/or the second aftertreatment component being displaceable along the second longitudinal axis in the second mounting portion.

9. The aftertreatment assembly of claim 8, wherein the mounting structure further includes at least one connector, particularly a band or strip, configured to:
- non-rotatably and axially fix the second aftertreatment component in the second mounting portion in a tightened state of the connector, and
- allow rotational and/or axial displacement of the second aftertreatment component in an untightened state of the connector.

10. The aftertreatment assembly of claim 1, wherein the first aftertreatment component includes at least one of a diesel oxidation catalyst and a particle filter.

11. An aftertreatment assembly for an internal combustion engine, the aftertreatment assembly comprising:
- a first aftertreatment component including a first inlet;
- a first pipe connection fluidly connected to the first inlet, the first pipe connection including:
  - a first adjustable spherical pipe joint configured to join two angularly offset pipe sections, and
  - a first slip pipe joint configured to join two axially aligned pipe sections to adjust a combined length of the two axially aligned pipe sections;
- a second pipe connection fluidly connected to a first outlet of the first aftertreatment component, the second pipe connection including at least one of:
  - a second spherical pipe joint configured to join two angularly offset pipe sections, and
  - a second slip pipe joint configured to join two axially aligned pipe sections to adjust a combined length of the two axially aligned pipe sections;
- a second aftertreatment component; and
- a third aftertreatment component fluidly interconnected between the first aftertreatment component and the second aftertreatment component, the third aftertreatment component including a fluid injector for injecting a selective catalytic reduction agent, and a mixing pipe,
wherein the second aftertreatment component includes a selective catalytic reduction catalyst.

12. The aftertreatment assembly of claim 11, wherein the third aftertreatment component is connected to an inlet of the second aftertreatment component via a third slip pipe joint configured to join two axially aligned pipe sections inserted into each other for adjusting a combined length of the two axially aligned pipe sections.

13. A method for mounting an aftertreatment assembly to an exhaust outlet of an internal combustion engine, the aftertreatment assembly including a first aftertreatment component including a first inlet and a first outlet;
a mounting structure including a first mounting portion for mounting the first aftertreatment component; and
a first pipe connection fluidly connected to the first inlet, the first pipe connection including:
- a first adjustable spherical pipe joint configured to join two angularly offset pipe sections, and
- a first slip pipe joint configured to join two axially aligned pipe sections to adjust a combined length of the two axially aligned pipe sections,
wherein the first aftertreatment component includes a first longitudinal axis, and the first aftertreatment component is rotatable in the first mounting portion about the first longitudinal axis and/or the first aftertreatment component is displaceable along the first longitudinal axis in the first mounting portion,
the method comprising:
fastening the mounting structure to an engine block of the internal combustion engine;
arranging the first aftertreatment component at the first mounting portion;
connecting the first pipe connection between the exhaust outlet and the first inlet;
adjusting and tightening the first slip pipe joint and the first adjustable spherical pipe joint from upstream to downstream, and thereby, adjusting a position of the first aftertreatment component relative to the first mounting portion; and
after adjusting the position of the first aftertreatment component, fastening the first aftertreatment component to the first mounting portion.

14. The method of claim 13, further comprising
arranging a second aftertreatment component at a second mounting portion of the mounting structure;
connecting the first outlet of the first aftertreatment component to a second inlet of the second aftertreatment component via a second pipe connection;
adjusting and tightening a second slip pipe joint and a second spherical pipe joint from upstream to downstream, and thereby, adjusting a position of the second aftertreatment component relative to the second mounting portion; and
after adjusting the position of the second aftertreatment component, fastening the second aftertreatment component to the second mounting portion.

* * * * *